United States Patent Office 3,687,869
Patented Aug. 29, 1972

3,687,869
HYDROCRACKING CATALYST
Albert L. Hensley, Jr., Munster, Ind., assignor to
Standard Oil Company, Chicago, Ill.
No Drawing. Filed Apr. 9, 1969, Ser. No. 814,858
Int. Cl. B01j *11/40*
U.S. Cl. 252—455 Z
9 Claims

ABSTRACT OF THE DISCLOSURE

This invention concerns a hydrocracking catalyst including an ultrastable molecular sieve impregnated with a platinum series metal. The sieve is characterized by (a) a maximum cubic cell dimension of about 24.55 A., (b) hydroxyl infrared adsorption bands at or near 3700 cm.$^{-1}$ and 3625 cm.$^{-1}$, and (c) an alkali metal content of less than about 1 weight percent. This impregnated sieve is dispersed in a silica-alumina matrix, and the sieve-matrix mix is impregnated with an oxide of a metal, sulfide of a metal, or a metal in Group VI or VIII of the Periodic Table other than the platinum series metals.

BACKGROUND OF THE INVENTION

In the petroleum industry, a high boiling hydrocarbon feed is converted into lower boiling gasoline by passing the feed mixed with hydrogen gas over a suitable catalyst. At elevated temperatures and pressures, due to the action of the catalyst, the molecules of the high boiling feed split apart into molecules making up the gasoline. A great deal of research is directed to developing catalysts which increase the yield of gasoline, and the principal objectives of my invention are to provide such a catalyst and processes for making and using the same.

DESCRIPTION OF THE INVENTION

I have discovered a novel hydrocracking catalyst, and hydrocracking process using my catalyst which provides increased yields of gasoline. In common with most hydrocracking catalyst, my catalyst has three chief ingredients: an inorganic supporting matrix, molecular sieves dispersed throughout the matrix, and a hydrogenating component dispersed throughout the sieve-matrix mix. What distinguishes my catalyst from other hydrocracking catalyst is the type of sieve employed and the way in which the hydrogenating component is distributed throughout the sieve-matrix mix. More specifically, the sieve is an ultrastable material; it is impregnated with from about 0.1 to about 2.0 weight percent based on the sieve of a platinum series metal; and the sieve-matrix mix is impregnated with from about 1 to about 20 weight percent based on the mix of oxide of a metal, sulfide of a metal, or metal in Group VI or VIII of the Periodic Table other than the platinum series metals. The preferred platinum series metals are platinum and palladium. I have also found that using cobalt and/or molybdenum to impregnate the sieve-matrix mix results in a superior catalyst. It is desirable to use from about 1.0 to about 7.0 weight percent cobalt based on the total weight of catalyst, and from about 3 to about 15 weight percent molybdenum based on the total weight of catalyst. Preferably, about 0.5 to about 1.0 part by weight of sieve are used to one part by weight of matrix.

Locating the platinum series metal on the sieve results in a highly active and selective catalytic composition. Most cracking occurs on the surface of the sieve, and during cracking, olefins are produced. These olefins tend to form coke, and they also reduce the yield of heavy naphtha. Moreover, if these olefins are fed into an isomerization unit, the olefins slowly poison the isomerization catalyst. With the platinum series metal on the sieve, most of the olefin is immediately hydrogenated. Thus, olefin production is minimized and naphtha yield is maximized.

DESCRIPTION OF THE PREFERRED EMBODIMENT

Molecular Sieve: In general, molecular sieves are aluminosilicate materials having a crystal structure which provides a network of relatively small cavities interconnected by numerous pores. These pores have an essentially uniform diameter at their narrowest cross-section. The sieve which I employ in making my catalyst has three characterizing features: (a) a maximum cubic cell dimension of about 24.55 A., (b) hydroxyl infrared adsorption bands at or near 3700 cm.$^{-1}$ and 3625 cm.$^{-1}$, and (c) an alkali metal content of less than about 1 weight percent. The preferred cubic cell dimension ranges between 24.20 and 24.55 A.

This sieve, which is discussed in U.S. Patent No. 3,293,192 and my co-pending application of Ser. No. 788,832, filed Jan. 3, 1969, is highly stable. That is, its surface area does not decrease substantially after calcination, steaming, or repeated wettings with water. Consequently, it retains its catalytic activity for longer periods than most other known sieves. For example, this sieve can withstand calcination at 1725° F. for several hours (2 hours) and still retain a surface area of 150 square meters per gram. The sieve can also withstand steaming using air saturated with about 25 weight percent steam at 1525° F. for 16 hours and still retain a surface area of more than 200 square meters per gram. The following test further illustrates the utrastability of this sieve:

WETTING AND DRYING TEST

Compress pulverized sieve containing about 2 percent sodium at a pressure of 5 tons per square inch into a 1.25 inch diameter steel dye to form a self-supporting wafer weighing about 0.03 gram. Subsequently suspend the wafer from a quartz-helix balance in a vacuum system including conventional high-vacuum equipment which produces a 10$^{-4}$ torr pressure. Dry the wafer by evacuation for one hour at 500° F., and then cool to −196° C. Then measure the extent of adsorption of nitrogen gravimetrically at several pressures between 10 and 200 torr, warm the wafer to room temperature, and then evacuate the balance for 15 minutes to remove the nitrogen. Subsequently, expose the wafer to water vapor at 16–18 torr for about one hour until the wafer is essentially saturated with water. Then heat the wafer to 500° C. over a period of about 25 minutes, dry by evacuation for one hour at 500° C., and cool. Finally, measure the adsorption of nitrogen again at −196° C. The above wet-dry cycle is repeated at least one more time. The sieve employed in my catalyst when so exposed to repeated wetting exhibits very low loss in nitrogen adsorption capacity. At 60 torr this loss is about 2 percent per wet-dry cycle.

As set forth in U.S. Patent No. 3,293,192, the sieve is further identified by its X-ray diffraction pattern, which is:

A.
14.15
8.65
7.37
5.604
4.691
4.312
3.85
3.717
3.41
2.976
2.8
2.724
2.597

The sieve is also considered to have large pores, that is, it has pores large enough to permit passage of benzene or larger molecules. Normal,y, pore size is about 8 to 10 A.

Hydrogenating Component: Oxides of metals, sulfides of metals, and metals of Groups VI and VII of the Periodic Table are good hydrogenating materials. The most active metals are platinum series metals, namely, platinum, palladium, osmium, rhodium, ruthenium, and iridium. But the platinum series metals are very expensive. Consequently, other Group VI and VIII metals are used in place of the platinum series metals, especially cobalt and molybdenum. I have found that a superior catalyst is formed by impregnating the above-described sieve material with a platinum series metal, and then dispersing the impregnated sieve in a suitable matrix, and finally impregnating the sieve-matrix mix with an oxide of a metal, sulfide of a metal, or metal in Group VI or VIII of the Periodic Table other than a platinum series metal. Only a minimum amount of platinum series metal is used, therefore, cost is reduced.

Matrix: The matrix is an inorganic catalytic cracking catalyst, preferably a porous, non-crystalline material such as alumina or a silica-alumina mix. Such materials are well known in the art. The most preferred matrix is a silica-alumina mix containing from about 10 to about 50 weight percent alumina.

EXAMPLE

To prepare the catalyst of my invention, first impregnate 100 grams of the above-described sieve with 100 milliliters of solution which contains 0.5 gram of palladium as palladium chloride dissolved in water. Add ammonium hydroxide solution drop-wise to adjust the pH of the slurry to about 8.0. Dry the palladium-impregnated sieve at 70–80° C. for 20 hours and then at 300° C. for 2 hours. Next dilute 750 grams of a silica-alumina sol (12–14 percent solids, American Cyanamid Company) with 500 milliliters of water, add 10 grams of the palladium-impregnated sieve, and disperse the mix using a high-speed blender. Set this slurry by bubbling ammonia gas through it, and then dry at 70–80° C. for 20 hours and then at 200° C. for 6 hours. The resulting dry cake is ground to a fine powder which then is mixed with an amminical solution containing 12.5 grams of ammonia molybdate and 19 grams of cobalt acetate dihydrate. Dry this slurry at 150° C. for 6 hours and pelletize into ⅛ inch pills and calcine the pills at 1000° F. for 2 hours.

The catalyst prepared in accordance with the above procedures, when used to hydrocrack an oil feed, such as a heavy catalytic cycle oil, will provide high yields of heavy naphtha. I attribute this to the location of the platinum series metal on the molecular sieve.

I claim:

1. A catalyst comprising:
   a porous, inorganic cracking catalytic matrix in which are suspended large pore, crystalline aluminosilicate molecular sieves characterized by:
   (a) a maximum cubic cell dimension of about 24.55 A.;
   (b) hydroxyl infrared adsorption bands at or near 3700 cm.$^{-1}$ and 3625 cm.$^{-1}$; and
   (c) an alkali metal content of less than about 1 weight percent;
   said sieves being impregnated with from about 0.1 to about 2.0 weight percent based on the sieve of a platinum series metal; and
   said sieve-matrix mix being impregnated with from about 1 to about 20 weight percent based on the mix of an oxide of a metal, sulfide of a metal, or metal in Group VI or VIII of the Periodic Table other than a platinum series metal.

2. The catalyst defined in claim 1 wherein the cubic cell dimension ranges between about 24.20 and about 24.55 A.

3. The catalyst defined in claim 1 wherein the platinum series metal is platinum or palladium.

4. The catalyst defined in claim 3 wherein the Group VI and VIII metal other than a platinum series metal is cobalt or molybdenum.

5. The catalyst defined in claim 4 wherein the matrix is silica-alumina comprising from about 10 to about 50 weight percent alumina.

6. The catalyst defined in claim 5 wherein from about 0.05 to about 1.0 part by weight of sieve are used to one part by weight matrix.

7. A process for preparing a catalyst comprising:
   (a) impregnating with a platinum series metal a large pore, crystalline aluminosilicate molecular sieve characterized by a maximum cubic cell dimension of about 24.55 A., hydroxyl infrared adsorption bands at or near 3700 cm.$^{-1}$ and 3625 cm.$^{-1}$, and an alkali metal content of less than about 1 weight percent;
   (b) dispersing the impregnated sieve in an inorganic catalytic cracking matrix; and
   (c) impregnating the sieve-matrix mix with an oxide of a metal, sulfide of a metal, or metal in Group VI or VIII of the Periodic Table other than platinum series metal.

8. The process defined in claim 7 wherein from about 0.1 to about 2.0 weight percent based on the sieve of a platinum series metal is used; and from about 1 to about 20 weight percent based on the mix of the Group VI or VIII metal other than platinum series metal is used.

9. The process defined in claim 8 where from about 0.05 to about 1.0 part by weight of sieve are used to one part by weight matrix.

References Cited

UNITED STATES PATENTS

| | | | |
|---|---|---|---|
| 3,210,267 | 10/1965 | Plank et al. | 252—455 X |
| 3,344,058 | 9/1967 | Miale | 252—455 X |
| 3,450,626 | 6/1969 | Wight et al. | 252—455 X |
| 3,431,196 | 3/1969 | Dobres et al. | 208—111 |

CARL F. DEES, Primary Examiner

U.S. Cl. X.R.

208—111